(No Model.)
W. CALVER.
APPARATUS FOR STORING AND DISTRIBUTING SOLAR HEAT.
No. 290,851. Patented Dec. 25, 1883.
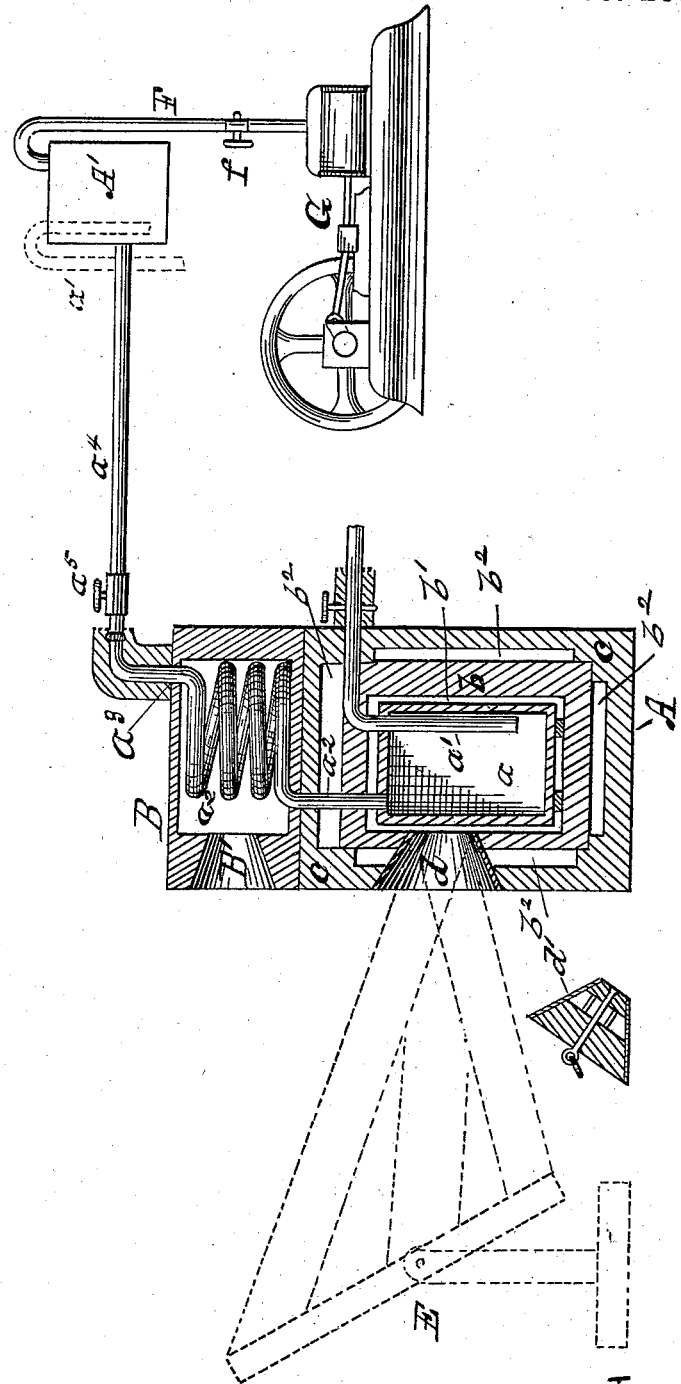
Witnesses:
Louis C. Hills
E. E. Masson
Inventor
William Calver.
By E. B. Stocking
Atty.

United States Patent Office.

WILLIAM CALVER, OF WASHINGTON, DISTRICT OF COLUMBIA.

APPARATUS FOR STORING AND DISTRIBUTING SOLAR HEAT.

SPECIFICATION forming part of Letters Patent No. 290,851, dated December 25, 1883.

Application filed April 12, 1883. (No model.)

*To all whom it may concern:*

Be it known that I, WILLIAM CALVER, a citizen of the United States, residing at Washington, in the District of Columbia, have invented certain new and useful Improvements in Apparatus for the Storage and Distribution of Solar Heat, of which the following is a specification, reference being had therein to the accompanying drawing.

The objects of my present invention are in part to provide means for the storage of the heat of the sun in such manner as to render it available for practical purposes; also, to provide means for the distribution of the same from a main or principal plant, storage device, or station to local stations, and to accomplish other objects, which will appear in the following description of the means employed in an embodiment of my invention for practical use, the novel elements of which will be specifically set forth in the claims.

In the accompanying drawing, A represents a heat-storage device constructed in accordance with my invention, and comprising a reservoir, $a$, which may be of any desired shape, although in the present instance it is represented in central vertical section as simply a rectangular receptacle. The material of which it is constructed may be anything suited to the circumstances of each case wherein solar heat is to be applied to practical use by any manner of means. If for the purpose of the production of steam by solar heat, the reservoir $a$ would be preferably made of strong boiler-iron, and would be provided with an inlet, $a'$, and an outlet, $a^2$, whereby when solar heat is stored therein, and, if desired, in a quantity of water supplied and maintained by the supply pipe or inlet $a'$, steam is produced, and may be retained therein at relatively excessively high pressure, and by means hereinafter described delivered therefrom to desired points for use. By cutting off the escape of steam the water within the reservoir becomes simply an absorbent of the heat supplied to the reservoir, and by suitable means said heat may be retained or stored therein, to be afterward utilized for practical purposes.

A solid instead of a liquid may be used to absorb the heat. Such means I have devised, and they comprise air-spaces $b'\ b^2$, formed by an enveloping case or jacket, $b$, made of any desirable material which is a non-conductor of heat—such as gypsum, asbestus, or other substance, or walls of masonry, the latter also constituting the outer walls, $c$, of the storage device as a whole; or, if desired, metal, cast, wrought, or rolled, may be employed, either alone or in connection with masonry. The air-space $b'$ is in this instance practically continuous and immediately adjacent the reservoir $a$, while the spaces $b^2$ are "dead" or non-communicating with each other, the objects being to favor conduction of heat in the space $b'$ and to obstruct conduction through the spaces $b^2$ and through the walls of the jacket. Several successive inclosing-jackets may be interposed between the reservoir $a$ and the outer walls, $c$, of the device, and hence several series of dead-spaces $b^2$ would be provided. A heat-supply orifice, $d$, is provided, and extends to the reservoir $a$, whereby the heat of the sun may, by the use of any suitable apparatus—as, for example, that for which a patent was granted me July 4, 1882—as shown in dotted lines at E, be directed into said orifice, so as to charge the reservoir. A door, $d'$, is provided to fit and close the orifice $d$, and it also is constructed with a similar number of walls and air-spaces as there are jackets in the entire device. Although the door $d'$ is shown herein as wholly removable, yet, if desired, it may be supported by hinges to the storage apparatus, and though shown as conical, any other desired configuration may be used.

By the means thus far described solar heat can be directed into the reservoir and stored therein and subsequently withdrawn therefrom through the outlet $a^2$, by conduction, convection, or any other usual manner of conveying heat. To overcome too rapid escape of the heat so stored, it is apparent that an increase of the jackets and intervening air-spaces will be sufficient, so that the heat supplied on sunny days may be employed for practical uses on cloudy days, and thus increase the availability of the heat of the sun to such uses.

To make up for any appreciable loss of heat during storage, and to provide means for greatly increasing the degree of the heat stored, I provide a superheater, B, which comprises a chamber the walls of which are composed of any suitable non-conducting substance, and a coiled or other formed continuation of the outlet $a^2$, located therein and emerging (as at $a^3$) therefrom, the portion outside of the walls being also covered by non-conducting material, as also the like portion of the inlet $a'$, such material being of such character and for a like purpose as usual in coating steam-pipes. With this coating in view it will be seen that the storage device A proper is completely surrounded by a non-conductor of heat, except at the heat-supply orifice, when the latter is open, the inlet and outlet being accessories for a secondary object, and even these fully protected throughout their length, whereby the escape of heat by conduction through the inlet and outlet laterally is prevented. Through the opening B' of the superheater, the door thereof being removed, (it being similar to the door $d'$,) solar heat may be directed against the coiled outlet $a^2$, and thus as the stored heat passes from the reservoir it is increased in degree as desired, either to restore a loss or to produce an excessive heat, when by means of the pipe $a^4$ and its valve $a^5$ said heat may be conducted to a local heat storing and supplying device, A', which is in all respects, except as to size, substantially similar to the device A, and by means of its outlet F and its valve $f$ said heat may be employed for practical uses—for example, to operate the engine G.

When the energy of solar heat is to be converted into steam-pressure water may be supplied in either the main storage station or device A or in the local station A', or any number of local stations. In the latter case suitable water-supply pipes, $a'$, would be provided in each local storage or supply device in addition to the heat-inlet $a^4$ thereof.

Having described my invention and its operation, what I claim is—

1. A solar-heat-storage device comprising a reservoir completely surrounded, except at the heat-supplying orifice, when open, with non-conducting material and a non-conducting door, substantially as specified.

2. A solar-heat-storage device comprising a doorless reservoir, a series of jackets forming air-spaces, and a door for closing heat-supplying orifices in said jackets, substantially as specified.

3. A solar-heat-storage device comprising a doorless reservoir, a series of jackets forming air-spaces and having heat-supplying orifices, and a multiple walled door having air-spaces, and adapted to close said heat-supplying orifices, substantially as specified.

4. A solar-heat-storage device comprising a water and steam reservoir provided with an inlet and outlet, a non-conducting covering completely surrounding the same, and a series of air-spaces, substantially as specified.

5. The combination of a solar-heat-storage device and a solar superheater, substantially as and for the purpose set forth.

6. The combination of a main solar-heat-storage device, a superheater, and local solar-heat supplying devices, substantially as specified.

7. The combination of a main solar-heat-storage device, a superheater, and a local solar-heat-storage device provided with a water-inlet with a steam-motor, substantially as shown and described.

8. The solar-heat-storage device A, comprising a reservoir, $a$, non-conducting jacket $b$, air-spaces $b'$ $b^2$, and outer wall or case, C, the jacket and wall being provided with a removable door, $d'$, substantially as shown and described.

9. The combination, with the storage device A, of the coiled outlet $a^2$ and superheating-chamber B, having the opening B', substantially as shown and described.

In testimony whereof I affix my signature in presence of two witnesses.

WILLIAM CALVER.

Witnesses:
E. B. STOCKING,
E. E. MASSON.